(12) United States Patent
Krieger

(10) Patent No.: US 9,004,015 B2
(45) Date of Patent: Apr. 14, 2015

(54) TETHERING STAKE

(76) Inventor: John M. Krieger, Cuyahoga Falls, OH (US)

(*) Notice: Subject to any disclaimer, the term of this patent is extended or adjusted under 35 U.S.C. 154(b) by 1234 days.

(21) Appl. No.: 12/398,380

(22) Filed: Mar. 5, 2009

(65) Prior Publication Data

US 2010/0224139 A1 Sep. 9, 2010

(51) Int. Cl.
*A01K 29/00* (2006.01)
*A01K 1/04* (2006.01)

(52) U.S. Cl.
CPC .. *A01K 1/04* (2013.01); *A01K 29/00* (2013.01)

(58) Field of Classification Search
USPC ................................ 119/786, 787, 788, 791
See application file for complete search history.

(56) References Cited

U.S. PATENT DOCUMENTS

| | | | | | |
|---|---|---|---|---|---|
| 110,066 | A | * | 12/1870 | Owings | 119/788 |
| 1,087,567 | A | * | 2/1914 | Bartosz | 119/790 |
| 2,087,176 | A | * | 7/1937 | Webb | 119/787 |
| 2,175,504 | A | * | 10/1939 | Ehmann | 59/85 |
| 2,314,941 | A | * | 3/1943 | Hayden | 119/788 |
| 2,525,890 | A | * | 10/1950 | Gage | 119/787 |
| 2,713,327 | A | * | 7/1955 | West | 119/790 |
| 3,921,589 | A | * | 11/1975 | McGahee | 119/786 |
| 5,226,829 | A | * | 7/1993 | Jones | 135/118 |
| 5,353,747 | A | * | 10/1994 | Fain | 119/780 |
| 5,463,834 | A | * | 11/1995 | Krieger | 52/155 |
| 6,314,916 | B1 | * | 11/2001 | Watson, Sr. | 119/788 |
| 6,374,777 | B1 | * | 4/2002 | Willinger | 119/791 |
| 6,758,456 | B2 | * | 7/2004 | Krieger | 248/530 |
| 6,766,770 | B1 | * | 7/2004 | Voorhees | 119/786 |
| 2002/0066417 | A1 | * | 6/2002 | Frazer et al. | 119/769 |
| 2004/0144332 | A1 | * | 7/2004 | Voorhees | 119/786 |
| 2007/0181079 | A1 | * | 8/2007 | Fong | 119/786 |
| 2007/0215064 | A1 | * | 9/2007 | Petersen | 119/786 |
| 2010/0199925 | A1 | * | 8/2010 | Lee | 119/708 |

* cited by examiner

*Primary Examiner* — Son T Nguyen
(74) *Attorney, Agent, or Firm* — Renner, Kenner, Greive, Bobak, Taylor & Weber Co., LPA

(57) ABSTRACT

A tethering stake includes a rod having a point at one end thereof and a driving cap at an opposite end. A collar is fixed to the rod adjacent to and spaced from the driving cap, thus providing a neck to receive a tether line or chain. A cap cover is slidingly received upon the rod and is adapted to be selectively engaged with the collar. The cap cover includes a central circular aperture with a radial slot extending therefrom. The centrally positioned aperture and slot allow the cover to assume a position substantially parallel to the rod during shipment and storage, while allowing it to take a position substantially orthogonal to the rod when the rod is driven into the ground.

8 Claims, 2 Drawing Sheets

TETHERING STAKE

TECHNICAL FIELD

The invention herein resides in the art of devices for restraining and maintaining animals and articles, and particularly for restraining pets, such as dogs. More particularly, the invention relates to a tethering stake that is adapted for ease of insertion into the ground, characterized by establishing a strong anchor in the ground, and demonstrating a low profile when in the ground.

BACKGROUND ART

The use of tethering stakes to secure articles or to restrain animals has been widely known. Most commonly, a wood or metal stake is driven into the ground and a rope or chain is secured to the top. However, such rudimentary tethering stakes are given to a loss of their anchoring capability when subjected to the force that is often imparted by a restrained animal. Moreover, basic tethering stakes often protrude above the ground to such a degree as to pose a hazard to those simply walking in the area, or to present an obstacle to lawnmowers and the like.

The prior art has experienced the advent of tethering stakes with anchoring arms, both pivotal and stationary, to establish a more positive anchoring effect than would otherwise be achieved. However, these anchoring arms have typically not been configured in such a manner as to maximize their effectiveness in ensuring increased resistance to increased force of extraction.

Prior art tethering stakes have also been devised to maintain a low profile in the ground in order to minimize obstacles to mowing or walking in the area. Additionally, such tethering stakes have been characterized by dome caps, near the top of the tethering stake, to limit the insertion into the ground, while also providing a curved plate or abutment for impact by mowers and feet, rather than the abrupt nature of a simple stake. However, the prior art stakes have been characterized with a cap that is fixed to the stake, as by welding or the like, thus providing a significant impediment to efficiencies in handling, packaging and storage.

There is, accordingly, a need in the art for a tethering stake which is capable of ease of insertion into the ground, and provides a secure anchor, that is attractive and of a low profile in use, and that is of a compact nature, given to ease of packaging, shipping, handling and stocking.

DISCLOSURE OF INVENTION

In light of the foregoing, it is a first aspect of the invention to provide a tether stake that effects a secure anchor.

Another aspect of the invention is the provision of a tether stake that is characterized by ease of insertion into the ground.

Still a further aspect of the invention is the provision of a tether stake that maintains a low profile, with minor protrusion above the ground.

Yet a further aspect of the invention is the provision of a tether stake which has effective anchoring arms that pose little impediment to insertion of the stake into the ground, while greatly inhibiting retraction from the ground.

Yet another aspect of the invention is the provision of a tethering stake that is given to compact packaging for distribution, handling, and retail storage.

The foregoing and other aspects of the invention that will become apparent as the detailed description proceeds are achieved by a tethering stake, comprising: a rod, said rod having a point at a first end thereof and a driving cap at a second opposite end thereof; a collar fixed to said rod adjacent to and spaced from said driving cap, defining a neck therebetween; a tether line secured about said neck between said driving cap and said collar; and a cover cap slidingly received by said rod, said cover cap being selectively engageable with said collar.

Still further aspects of the invention which will become apparent herein are achieved by a tethering stake, comprising: a rod, said rod having a point at a first end thereof and a driving cap at a second opposite end thereof; a collar fixed to said rod adjacent to and spaced from said driving cap, defining a neck therebetween; a tether line secured about said neck between said driving cap and said collar; and a cover cap having a key slot slidingly receiving said rod and being selectively engageable with said collar, said key slot having a central aperture for receiving said collar, and a radial slot extending from said aperture.

DESCRIPTION OF DRAWINGS

For a complete understanding of the various aspects of the invention, reference should be made to the following detailed description and accompanying drawings wherein.

BEST MODE FOR CARRYING OUT THE INVENTION

Figure 1:
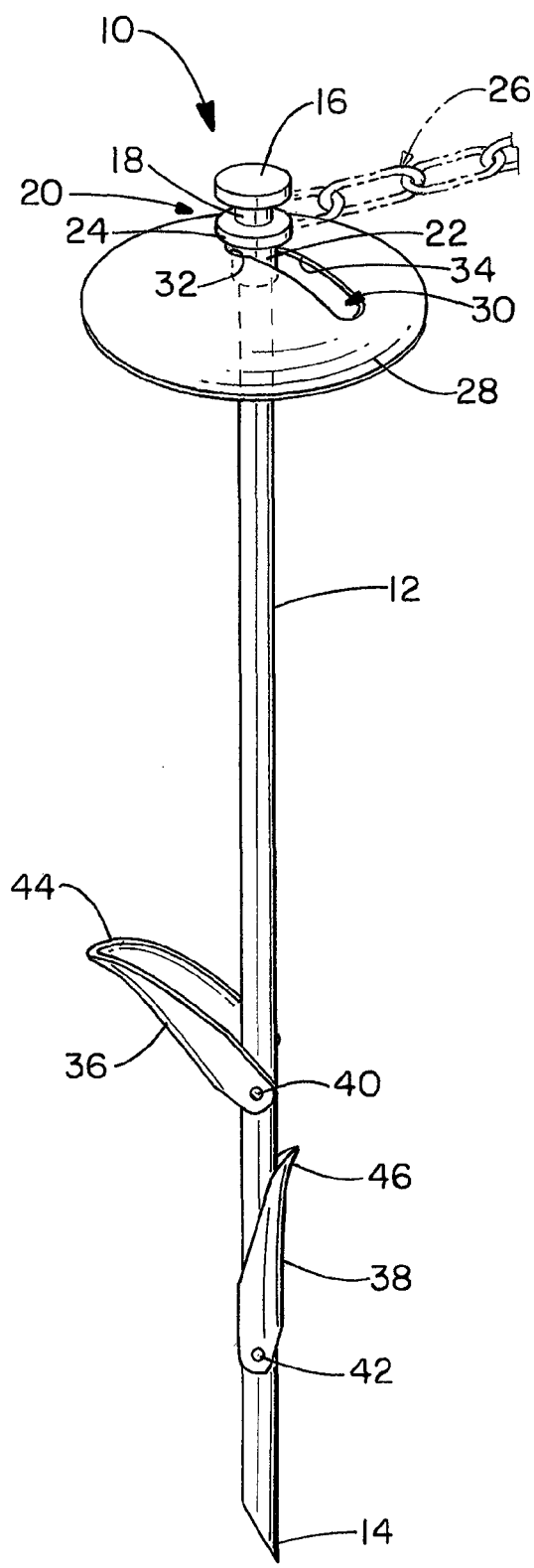
FIG. 1 is a perspective view of the tethering stake according to the invention.
Figure 2:
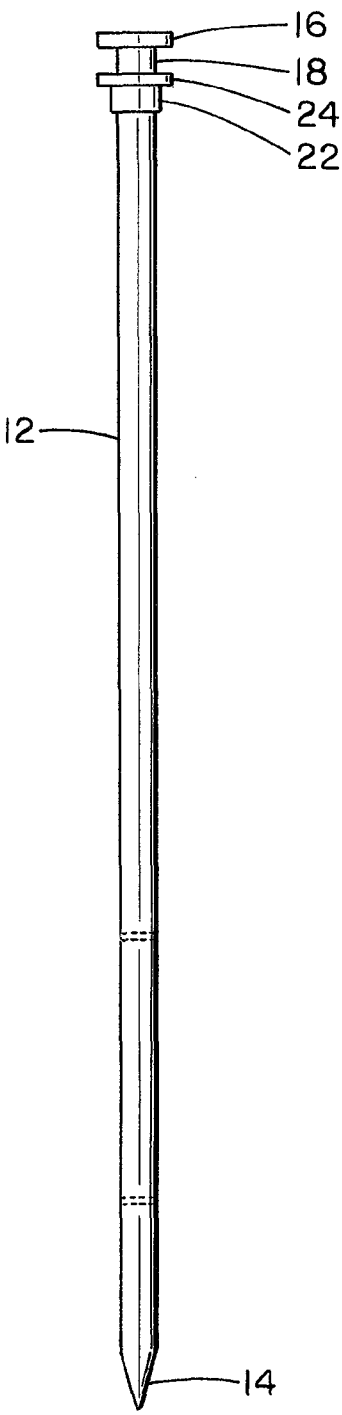
FIG. 2 is an elevational view of the stake portion alone.
Figure 3:
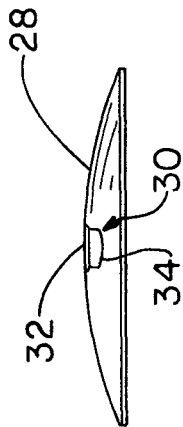
FIG. 3 is a top view of the cover cap employed in the tethering stake of the invention.
Figure 4:
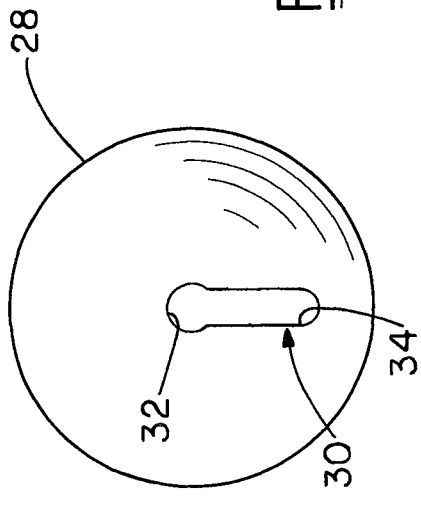
FIG. 4 is an elevational view of the cover cap of FIG. 3.

Referring now to the drawings, it can be seen that a tether stake made in accordance with the invention is designated generally by the numeral 10. The tether stake 10 includes a rod or shaft 12, typically having a circular cross section of a diameter of 0.375-0.75 inch, and a length on the order of 10-20 inches. The rod or shaft 12 is preferably pointed at the end 14, the point being imparted by means of a bias cut, as shown, or by grinding of the rod or shaft to a conical point. The opposite end of the rod or shaft 12 is a driving cap 16 which is welded or otherwise affixed thereto, or made integral therewith. The driving cap 16 is employed for being driven into the ground by a hammer or the like.

Figure 5:
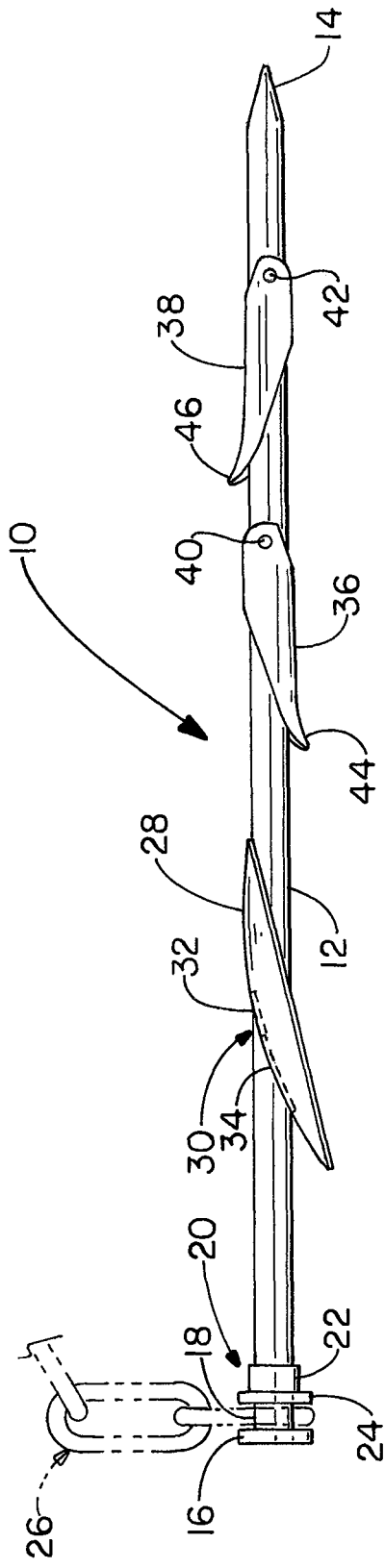
FIG. 5 is an elevational view of the tethering stake of the invention showing the cover cap received upon the stake in a compact nature, and illustrating the locking cups pivotally folded against the stake.

A neck 18, which may be simply an extension of the rod 12, is defined between the driving cap 16 and a collar 20 that is fitted over and secured to the rod 12, as shown. The collar 20 includes a short cylindrical member 22 from which extends a shoulder disk 24, such that the neck 18 extends between the shoulder disk 24 and the cap 16. The neck 18 is provided to receive and secure a tether line thereto, and to maintain the tether line between the cap 16 and disk 24. As shown in FIGS. 1 and 5, the tether line may comprise a chain link or the like, the opening of the link receiving the neck 18 while being smaller than the diameters of the disk 24 and cap 16 so as to be retained therebetween.

A cover cap 28, of a slightly domed shape, is adapted to be received by the short cylindrical member 22 to extend radially about the rod 12. The cover cap 28 is characterized by a key slot 30, for purposes that will become apparent later herein. The key slot 30 includes a circular aperture 32 having a radial slot 34 extending therefrom. The circular aperture 32 is centered upon the center of the circular cap cover 28 and extends thereabout. The aperture 32 is sized to receive the short cylindrical member 22 of the collar 20. The radial slot 34, extending from the aperture 32, is sized to receive and pass the rod 12.

Attached to a lower portion of the rod 12 are a pair of locking claws or cups 36, 38, preferably positioned on opposite sides of the rod 12. The locking cups 36, 38 are pivotally connected by means of pivot pins 40, 42. The cups 36, 38 are, in the preferred embodiment, characterized by flared or arched ends 44, 46. Those skilled in the art will appreciate that the locking cups 36, 38 are pivoted against the rod 12 while the rod is being driven into the ground, the ground itself forcing the cups against the rod. However, when an attempt is made to retract the stake assembly 10, as by pulling the rod 12 by the cap 16, the arched ends 44, 46 of the locking cups 36, 38 extend outward and engage the earth, as the lower ends of the locking cups 36, 38 lock against the rod 12, thus impeding the withdrawal of the stake.

A particular feature of the instant invention is the capability of the assembly to be packaged in a compact form. The circular aperture 32 and radial slot 34 assure this capability. As shown in FIG. 5, the cover cap 28 can be laid against the rod 12 when the circular aperture 32 is directed toward the point 14, and with the rod 12 being received by the radial slot 34. Since aperture 32 obviously extends beyond the center point of the cap cover 28, and is of a larger diameter than the rod 12, the cap cover 28 lies substantially flush with the rod 12 when positioned as in FIG. 5. This allows for compact packaging and ease of handling and storage. The tether stake 10 may be placed upon a cardboard backing and blister sealed or heat wrapped, as desired.

In use, the tether stake 10 is placed with the point 14 against the ground and is driven by a hammer or the like against the driving cap 16. As the cap 16 nears the ground level, the cylindrical member 22 is brought into fitting registration with the aperture 32 and the driving is continued until the cover cap 28 engages the ground about the circumference thereof. At this point, the tether stake 10 has a very low profile, on the order of approximately 1 inch, such as to be conducive to walking or mowing in the area. The cap 28 keeps the tethering line 26 free from grass and yard debris that can tend to tangle the tethering line and impede free turning. Additionally, the cap 28 provides that one may mow closely to the stake and provides an aesthetically pleasing appearance to the tether stake 10.

Thus it can be seen that the various aspects of the invention have been achieved by the structure presented herein above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A tethering stake, comprising:
a rod, said rod having a point at a first end thereof and a driving cap at a second opposite end thereof;
a collar fixed to said rod adjacent to and spaced from said driving cap, defining a neck therebetween;
a tether line secured about said neck between said driving cap and said collar; and
a cover cap slidingly received by said rod, said cover cap being selectively engageable with said collar having a key slot therein, said key slot slidingly receiving said rod and securedly receiving said collar, said key slot being formed by a central aperture for receiving said collar, and a radial slot extending from said aperture, said key slot causing said cover cap to extend orthogonally from said rod when said collar is received by said central aperture, and to lie axially along and substantially flush to said rod when said rod lies within and along said key slot.

2. The tethering stake according to claim 1, wherein said collar comprises a cylindrical member having a disk at one end thereof, said disk defining a shoulder extending beyond said cylindrical member, said disk being positioned opposite said driving cap.

3. The tethering stake according to claim 2, wherein said neck of said rod is maintained between said disk and said driving cap.

4. The tethering stake according to claim 3, wherein said tethering line comprises a link chain, secured to said neck.

5. The tethering stake according to claim 1, further comprising at least one locking cup pivotally secured to said rod, said locking cup comprising an elongated cupped member pivotally movable between positions substantially parallel and substantively orthogonal to said rod.

6. The tethering stake according to claim 5, wherein said locking cup is arched at a first end opposite a second end that is pivotally connected to said rod.

7. A tethering stake, comprising:
a rod, said rod having a point at a first end thereof and a driving cap at a second opposite end thereof;
a collar fixed to said rod adjacent to and spaced from said driving cap, defining a neck therebetween;
a tether line secured about said neck between said driving cap and said collar; and
a cover cap having a key slot slidingly receiving said rod and being selectively engageable with said collar, said key slot having a central aperture for receiving said collar, and a radial slot extending from said aperture, said key slot causing said cover cap to extend radially from said rod when said collar is received by said central aperture and to lie substantially flush upon said rod when said rod lies within and along said key slot.

8. The tethering stake according to claim 7, further comprising a pair of locking cups pivotally secured to said rod, each said locking cup being pivotally secured at a first end to said rod and being rotatable between positions substantially parallel and substantially orthogonal to said rod.

* * * * *